Sept. 3, 1957  C. E. PHILLIPS ET AL  2,805,322
APPARATUS FOR FORMING PROTUBERANCES ON STAMPING TOOLS
Filed Nov. 23, 1953

INVENTORS
CHARLES E. PHILLIPS
BY  PETER N. FRADE

ATTORNEYS

United States Patent Office 2,805,322
Patented Sept. 3, 1957

2,805,322

APPARATUS FOR FORMING PROTUBERANCES ON STAMPING TOOLS

Charles E. Phillips and Peter N. Frade, Detroit, Mich.; said Frade assignor to said Phillips; Charles A. Dean, executor of said Charles E. Phillips, deceased Application November 23, 1953, Serial No. 393,742

2 Claims. (Cl. 219—130)

Punches and dies used for forming stampings are usually provided with protuberances which function to separate or eject the stamping from the tool. These protuberances are usually formed by grinding away a portion of the shearing or cutting edge of the tool, leaving a portion projecting therefrom. Such operation is wasteful and necessitates repeating from time to time.

It is the object of the invention to form such protuberances without cutting away any portion of the tool and to this end the invention consists in the method and apparatus as hereinafter set forth.

Generally described the method comprises welding a small quantity of metal to the tool to form the projection. This however must be accomplished without heating up the tool to a point where its temper will be drawn. It is therefore necessary to limit the quantity of heat generated by the operation and at the same time weld on sufficient metal to form a projection of the required size. This is accomplished as follows:

A is a tool which carries a consumable electrode B of small cross-section and which forms one terminal of an electric circuit, the other terminal being the member on which the protuberance is to be formed. The end of the tool is formed with an insulator member C which is fashioned to provide a socket or guide concentric with the electrode for positioning the punch or other member on which the protuberance is to be formed in fixed registration therewith. The outer surface of the tool is also provided with an insulating covering D so as to protect the hands of the operator from electrical contact. E are resilient strips on opposite sides of the tool having their end portions extending into apertures F and into contact with the electrode B. These members are also externally insulated and serve as pawls, which when pressed inward will slightly advance the electrode to contact the same with the work and to form an arc. As the electrode is of limited cross-section it will be rapidly consumed when the arc is formed and the molten metal will be welded on to the work tool to form the protuberance thereon. To limit the quantity of heat generated the voltage of the electrical energy is limited so that the arc will be automatically extinguished after a certain lengthening of the same due to consumption of the electrode. This will cut off the source of heat and avoid deterimentally heating the body of the work tool.

It will thus be apparent that the quantity of heat generated may be limited, first, by reduction of the cross-section of the electrode, and second, by reducing the voltage of the source of electrical energy. By properly selecting these two factors a protuberance may be welded on to a tool without drawing the temper thereof.

Figure 1:
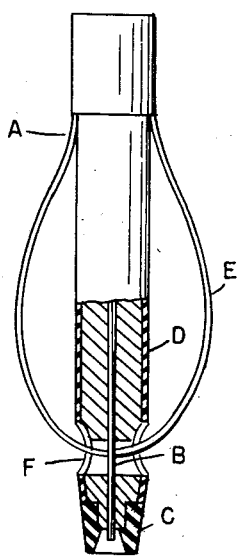
Fig. 1 is an elevation partly in section of the welding tool.
Figure 2:
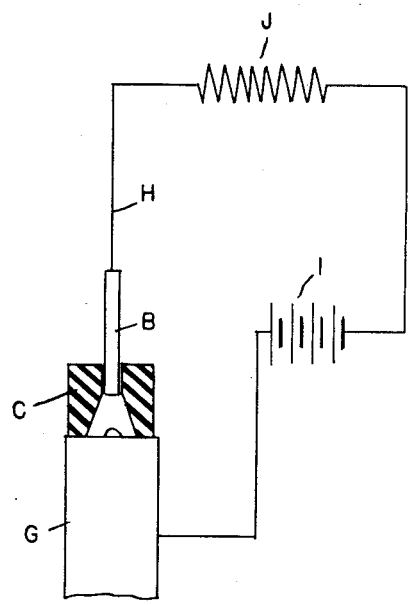
Fig. 2 is a diagram illustrating the manner of positioning the electrode in relation to the work and the method of operation in forming the protuberances.

As shown in Fig. 2, the insulator C of the tool A is contacting with a work piece such as a punch G and the electrode B is then moved into contact with said work piece. An electric circuit H including the electrode B and the member G is energized by suitable means such as a storage battery I and a resistor J in said circuit limits the amperage thereof. The battery is of relatively low voltage, such as from eighteen to thirty-two volts.

What we claim as our invention is:

1. A welding tool having means for holding the same in fixed registration with the work, a consumable electrode carried by said tool, means for connecting said tool and work in an electric circuit of predeterminedly limited voltage, means for initially contacting said electrode with the work to form an arc which will be automatically extinguished when drawn to a predetermined length by consumption of said electrode with the molten metal deposited on and welded to the work, means holding the body of the electrode in fixed relation to the work member with its consumable end portion in a surrounding space having no contact other than through the arc, and a manually operable resilient member mounted on said tool and engaging the electrode for advancing the same to initially contact the work.

2. Apparatus for welding a work ejecting protuberance on a tempered punch without drawing the temper thereof comprising means for forming an electric circuit including a consumable electrode in fixed registration and in contact with the end of the punch, the voltage of said circuit and the diameter of said electrode being predetermined to limit the heat generation by the automatic breaking of the circuit through consumption of the electrode and lengthening of the arc, a holder retaining said electrode and having an insulated portion in contact with said punch to maintain the same in fixed relation to each other, and a pair of resilient bowed members mounted on opposite sides of said holder with one end of each fixed and the other end engaging said electrode to constitute a manually operable means for the initial advancement thereof.

References Cited in the file of this patent

UNITED STATES PATENTS

| | | |
|---|---|---|
| 2,430,055 | Kennedy | Nov. 4, 1947 |
| 2,498,241 | Bowen | Feb. 21, 1950 |
| 2,510,000 | Willigen et al. | May 30, 1952 |